(12) United States Patent
Fu

(10) Patent No.: US 11,175,692 B2
(45) Date of Patent: Nov. 16, 2021

(54) BACK COVER AND DISPLAY DEVICE INCLUDING THE SAME

(71) Applicant: Beijing Xiaomi Mobile Software Co., Ltd., Beijing (CN)

(72) Inventor: Jiande Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 42 days.

(21) Appl. No.: 16/688,532

(22) Filed: Nov. 19, 2019

(65) Prior Publication Data

US 2021/0018956 A1 Jan. 21, 2021

(30) Foreign Application Priority Data

Jul. 18, 2019 (CN) .......................... 201921139122.3

(51) Int. Cl.
*G06F 1/16* (2006.01)
(52) U.S. Cl.
CPC .... *G06F 1/1607* (2013.01); *G06F 2200/1612* (2013.01)
(58) Field of Classification Search
CPC ................. G06F 1/1601; G06F 1/1607; G06F 2200/1612; G02F 1/133308; G02F 1/133314
See application file for complete search history.

(56) References Cited

U.S. PATENT DOCUMENTS

| 8,094,243 B2* | 1/2012 | Yokawa | F16M 11/10 348/794 |
| 8,896,996 B2* | 11/2014 | Sakamoto | G02F 1/133308 361/679.24 |
| 2014/0198474 A1* | 7/2014 | Byeon | H05K 7/183 361/809 |
| 2018/0136497 A1* | 5/2018 | Wang | F16M 11/10 348/794 |
| 2019/0187509 A1 | 6/2019 | Iemura et al. | |

FOREIGN PATENT DOCUMENTS

| EP | 2 757 408 A1 | 7/2014 |
| JP | 2013-243548 A | 12/2013 |
| KR | 10-2015-0061418 A | 6/2015 |

OTHER PUBLICATIONS

Extended European Search Report dated Mar. 9, 2020 in European Patent Application No. 19212500.3, 9 pages.

* cited by examiner

*Primary Examiner* — James Wu
(74) *Attorney, Agent, or Firm* — Oblon, McClelland, Maier & Neustadt, L.L.P.

(57) ABSTRACT

A display device includes a back cover. The back cover of display device can include a plurality of limiting screw through holes arranged at intervals along an edge of the back cover of the display device and a fixing screw through hole located in the middle of the back cover of display device. A first diameter of the limiting screw through hole can larger than a second diameter of a screw rod of the limiting screw, and the diameter of the fixing screw through hole is equal to the diameter of the screw rod of the fixing screw. The back cover of display device can have a thickness between 1 mm and 1.5 mm.

11 Claims, 3 Drawing Sheets

BACK COVER AND DISPLAY DEVICE INCLUDING THE SAME

CROSS-REFERENCE TO RELATED APPLICATIONS

This disclosure is based upon and claims priority to Chinese Patent Application No. 201921139122.3, filed on Jul. 18, 2019, the entire contents of which are incorporated herein by reference.

TECHNICAL FIELD

This disclosure relates to the technical field of display device, in particular to a back cover of display device and a display device including the same.

BACKGROUND

With the rapid development of display technology, requirements for display devices, such as TVs and computer display screens, are increasing. For example, screens of the display devices includes larger displaying areas and have an overall lighter weight. During the fabrication process of the display device, a back cover of display device can be made thin enough to reduce its weight. Further, it is necessary to carry out high-temperature environmental test on the produced back cover of display device for consideration of safety of the back cover of display device.

SUMMARY

An embodiment of the present disclosure provides a back cover of a display device and a display device, which is able to solve problems caused by thermal expansion of the back cover of display device. A technical solution is provided.

In one aspect, the present disclosure provides a back cover of the display a device, wherein the back cover of the device has a thickness between 1 mm and 1.5 mm. The back cover of the device has a plurality of limiting screw through holes and a fixing screw through hole. The plurality of limiting screw through holes are arranged at intervals along an edge of the back cover of the display device, and the fixing screw through hole is located near the middle of the back cover of display device. Further, a first diameter of the limiting screw through hole is larger than a second diameter of a screw rod of the limiting screw, and a diameter of the fixing screw through hole is equal to a diameter of the screw rod of the fixing screw.

In the embodiment of the present disclosure, the thickness of the back cover of the display device is very thin for reducing the weight of the display device. By arranging the limiting screw through hole at the edge of the back cover of the display device, the first diameter of the limiting screw through hole is larger than the second diameter of the screw rod of the limiting screw, so that when the back cover of display device is heated, an expansion space at the edge can be ensured. Accordingly, this can avoid the wave-shaped deformation of the edge of the back cover of display device due to that the back cover of display device being forced against the screw rod of the limiting screw in a direction parallel to the surface of the back cover of display device. Since the back cover of the display device is not extruded, the back cover of display device can retract to the original shape after the normal temperature is restored without affecting the appearance of the back cover of display device. At the same time, the fixing screw through hole is arranged in the middle of the back cover of display device, so that the diameter of the fixing screw through hole is equal to the diameter of the screw rod of the fixing screw. Accordingly, the fixing screw can fix the back cover of display device together with a middle frame of display device, so as to ensure the stability of the back cover of display device.

In one implementation of the present disclosure, the difference between the first diameter of the limiting screw through hole and the second diameter of the screw rod of the limiting screw can be in a range of 1 mm to 2 mm. In this implementation, a sufficient gap between the limiting screw through hole and the screw rod of the limiting screw can be ensured to avoid the wave-shaped deformation of the edge of the back cover of display device due to that the back cover of display device when being heated to be expanded and forced against the screw rod of the limiting screw in a direction parallel to the surface of the back cover of the display device. At the same time, it can avoid too large gap between the periphery of the screw rod of the limiting screw and the limiting screw through hole and reducing the limiting effect of the limiting screw at the edge of the back cover of display device.

In one implementation of the present disclosure, the plurality of limiting screw through holes can include a first limiting screw through hole, an outer surface of the back cover of the display device is further provided with a screw cap groove for connecting with the first limiting screw through hole, and a third diameter of the screw cap groove is larger than a fourth diameter of the screw cap of the limiting screw.

In the implementation, the third diameter of the screw cap groove is larger than the fourth diameter of the screw cap of the limiting screw, so that a gap is left between the periphery of the screw cap of the limiting screw and the screw cap groove. Accordingly, this can avoid the wave-shaped deformation of the edge of the back cover of display device due to that the back cover of display device when being heated to be expanded and forced against the screw cap of the limiting screw in the direction parallel to the surface of the back cover of display device.

In one implementation of the present disclosure, the difference between the third diameter of the screw cap groove and the fourth diameter of the screw cap of the limiting screw can be in a range of 1 mm to 2 mm. In this implementation, a sufficient gap between the periphery of the screw cap of the limiting screw and the screw cap groove can be ensured, to avoid the wave-shaped deformation of the edge of the back cover of the display device due to that the back cover of display device when being heated to be expanded and forced against the screw cap of the limiting screw in a direction parallel to the surface of the back cover of display device. At the same time, too large gap between the periphery of the screw cap of the limiting screw and the screw cap groove can be avoided in order to not affect the appearance of the back cover of display device.

In one implementation of the present disclosure, a depth of the screw cap groove can be greater than a thickness of the screw cap of the limiting screw. In this implementation, since the depth of the screw cap groove is greater than the thickness of the screw cap of the limiting screw, so that when the outer surface of the screw cap of the limiting screw is configured flush with the surface of the back cover of display device, a gap is left between one side of the screw cap of the limiting screw close to the screw cap groove and the screw cap groove to prevent the back cover of display device when being heated from being forced against the screw cap of the limiting screw in a direction perpendicular to the surface of the back cover of display device.

In one implementation of the present disclosure, the difference between the depth of the screw cap groove and the thickness of the screw cap of the limiting screw can be in a range of 0.1 mm to 0.5 mm. In this implementation, a sufficient gap between the side of the screw cap of the limiting screw close to the screw cap groove and the screw cap groove can be ensured, in order to prevent the back cover of the display device when being heated to be expanded from being forced against the screw cap of the limiting screw in the direction perpendicular to the surface of the back cover of the display device. At the same time, this can avoid that the thickness of the back cover of the display device is increased due to too large gap and thereby increasing the overall weight of the display device.

In one implementation of the present disclosure, the back cover of display device is polycarbonate or acrylonitrile-butadiene-styrene plastic back cover. In this implementation, polycarbonate plastic has strong impact resistance and can improve the strength of the back cover of display device; acrylonitrile-butadiene-styrene plastic has high strength, lightness, smoothness, easy cleaning and good creep resistance, and can not only improve the strength of the back cover of display device, but also reduce the weight of the back cover of display device.

In one implementation of the present disclosure, the plurality of limiting screw through holes includes a second limiting screw through hole. Further, the outer surface of the back cover of display device can be further provided with a magnet lock groove for connecting with the second limiting screw through hole, and a fifth diameter of the magnet lock groove is larger than a sixth diameter of the magnet lock through which the limiting screw passes.

In this implementation, the fifth diameter of the magnet lock groove is larger than the sixth diameter of the magnet lock through which the limiting screw passes, so that a gap is left between the periphery of the magnet lock and the magnet lock groove. This can avoid the wave-shaped deformation of the edge of the back cover of display device due to that the back cover of display device when being heated to be expanded and forced against the magnet lock in the direction parallel to the surface of the back cover of display device.

In one implementation of the present disclosure, the difference between the fifth diameter of the magnet lock groove and the sixth diameter of the magnet lock can be in a range of 1 mm to 2 mm.

In this implementation, a sufficient gap between the periphery of the magnet lock and the magnet lock groove can be ensured that can avoid the wave-shaped deformation of the edge of the back cover of display device due to that the back cover of display device when being heated to be expanded and forced against the magnet lock in the direction parallel to the surface of the back cover of display device. At the same time, the too large gap between the periphery of the magnet lock and the groove of the magnet lock can be avoided in order to not affect the appearance of the back cover of display device.

As the other aspect, the present disclosure provides a display device. The display device includes a middle frame of the display device and the back cover of the display device as described above, and the back cover of the display device is connected with the middle frame of display device. In this implementation, the back cover of display device is connected with the middle frame of display device to ensure the stability of the back cover of display device.

In one implementation of the present disclosure, the middle frame of the display device has a plurality of screw holes, and the plurality of screw holes correspond to the limiting screw through holes one by one. A seventh diameter of the screw hole is equal to the second diameter of the screw rod of the limiting screw, a sum of the depth of the limiting screw through hole and the depth of the screw hole is smaller than a length of the screw rod of the limiting screw.

In this implementation, the seventh diameter of the screw hole in the middle frame of display device is equal to the second diameter of the screw rod of the limiting screw, to ensure that the back cover of the display device and the middle frame of the display device can be fixed together. The sum of the depth of the limiting screw through hole and the depth of the screw hole is smaller than the length of the screw rod of the limiting screw, so that a gap between the side of the screw cap of the limiting screw close to the screw cap groove and the screw cap groove can be ensured, to prevent the back cover of display device when being heated to be expanded and forced against the screw cap of the limiting screw in the direction perpendicular to the surface of the back cover of display device.

In one implementation of the present disclosure, the back cover of display device is rectangular, and the plurality of limiting screw through holes includes a second limiting screw through hole. The outer surface of the back cover of display device is further provided with a magnet lock groove for connecting with the second limiting screw through hole. The display device further includes a magnet lock, the limiting screw passes through the magnet lock, and a gap is formed between one side of the magnet lock close to the magnet lock groove and the magnet lock groove.

In the implementation, a gap between one side of the magnet lock close to the magnet lock groove and the magnet lock groove can be ensured, to prevent the back cover of display device when being heated to be expanded and forced against the magnet lock in the direction perpendicular to the surface of the back cover of display device.

In one implementation of the present disclosure, the magnet lock and the magnet lock groove can have a gap in a range of 0.1 mm to 0.5 mm. In this implementation, a sufficient gap between one side of the magnet lock close to the magnet lock groove and the magnet lock groove can be ensured, to prevent the back cover of display device when being heated to be expanded and forced against the magnet lock in the direction perpendicular to the surface of the back cover of display device. At the same time, this can avoid that the thickness of the back cover of display device is increased due to too large gap and thereby increasing the weight of the display device.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

A selected embodiment will now be explained with reference to the drawings. Hereinafter, the present disclosure will be described with reference to some embodiments and it is understood that the embodiments are not intended to limit the scope of the present disclosure. Moreover, as the contents disclosed herein should be readily understood and can be implemented by a person skilled in the art, all equivalent changes or modifications of the present disclosure should be encompassed by the appended claims.

Herein, measures and values, when used with words like "equal" or other similar terms, are to be understood so as to take into account measurement errors or inaccuracies due to production and/or manufacturing errors. For example, these terms, if associated with a value, can indicate a divergence of not more than 5% or 10% from that value.

Figure 1:
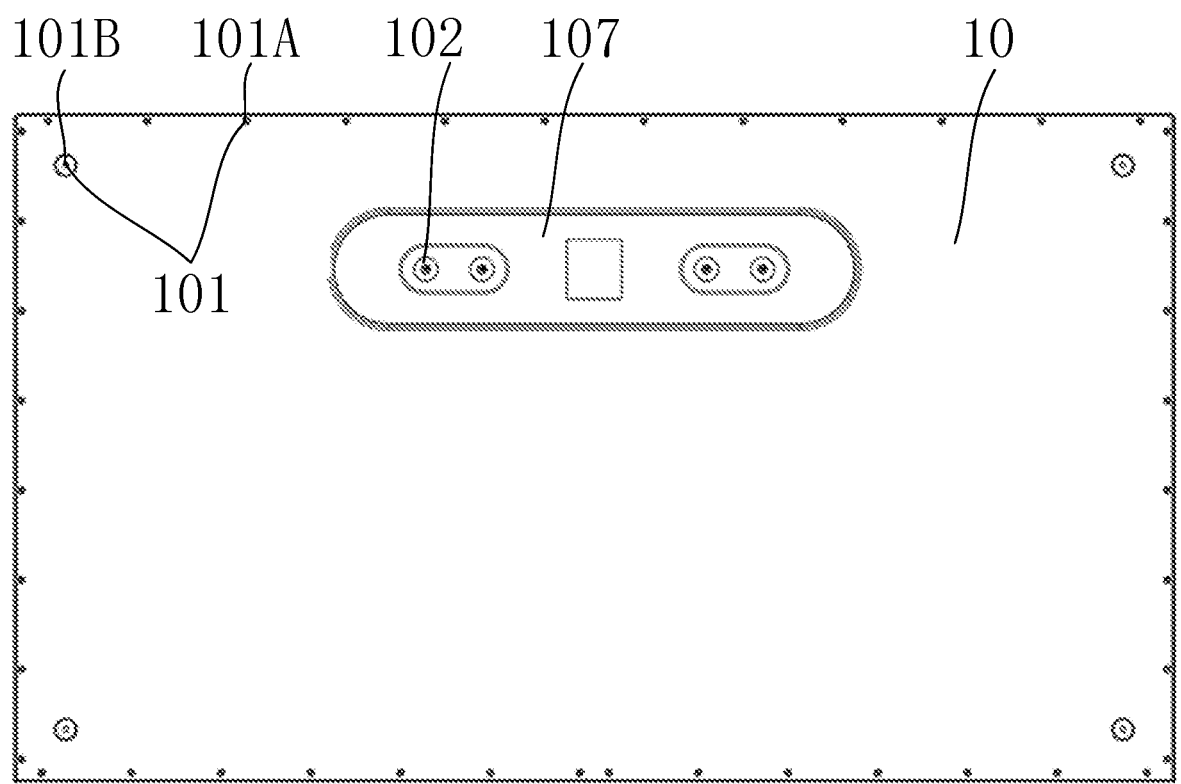
FIG. 1 is a schematic structural view of a back cover of display device according to an exemplary embodiment of the present disclosure.

FIG. 1 is a schematic structural view of a back cover of display device according to an exemplary embodiment of the present disclosure. As shown in FIG. 1, the back cover 10 of display device has a plurality of limiting screw through holes 101 and a fixing screw through hole 102, the plurality of limiting screw through holes 101 are arranged at intervals along an edge of the back cover 10 of display device, and the fixing screw through hole 102 is located in the middle of the back cover 10 of display device. The middle of the back cover refers to the middle portion of the back cover relative to the above-mentioned edge of the back cover, i.e., the fixing screw through hole 102 is located closer to the middle of the back cover 10 relative to the limiting screw through hole 101.

Figure 2:
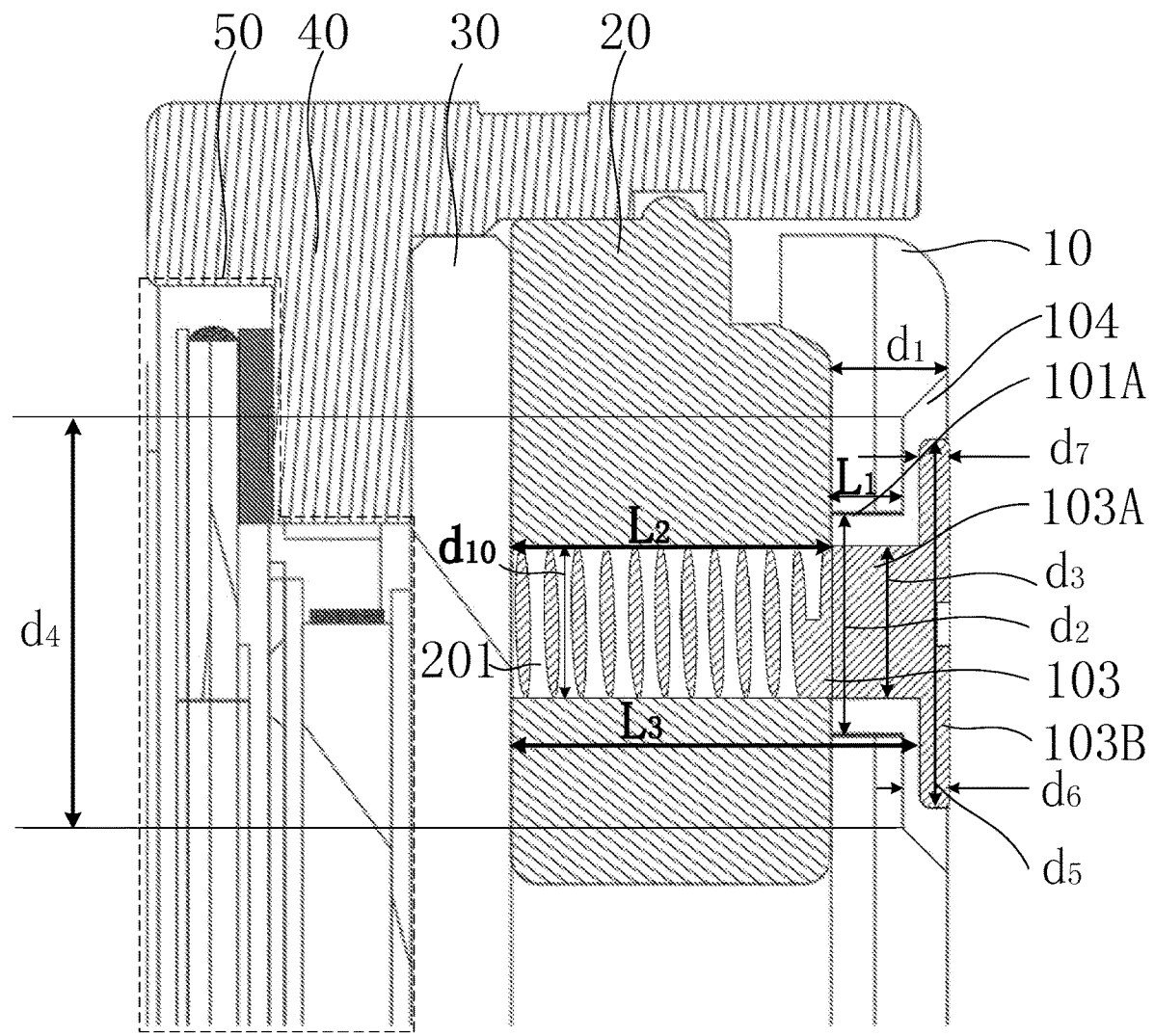
FIG. 2 is a schematic view of an assembly structure of a display device according to an exemplary embodiment of the present disclosure.

FIG. 2 is a schematic view of an assembly structure of a display device according to an exemplary embodiment of the present disclosure. As shown in FIG. 2, the back cover 10 of display device has a thickness $d_1$. A first diameter $d_2$ of the limiting screw through hole 101 is larger than a second diameter $d_3$ of a screw rod 103A of a limiting screw 103, and a diameter of the fixing screw through hole 102 is equal to a diameter of a screw rod of the fixing screw (not shown).

The limiting screw through hole 101 is used to install the limiting screw 103 to avoid deformation, such as warping, that can happen to the edge of the back cover. The fixing screw through hole 102 is used for installing fixing screw. The fixing screw fixes the back cover 10 of display device together with a middle frame of display device.

The back cover 10 of display device has the thickness $d_1$ in a range of 1 mm to 1.5 mm, so as to ensure the back cover 10 of display device is thin and light, and thus can reduce the overall weight of the display device. However, because of the back cover 10 of display device is thin, it can be subject to deformation. For example, in high temperature environment tests, the back cover 10 of display device can heated and therefore caused to expand. Under such circumstances, the back cover 10 of display device can be forced against the limiting screw 103 at an edge of the back cover 10 of the display device, causing wave-shaped deformation of the edge of the back cover 10 of display device. According to a technical solution of the present disclosure, the first diameter $d_2$ of the limiting screw through hole 101 is larger than the second diameter $d_3$ of the screw rod 103A of the limiting screw 103 to avoid excessive forces of the back cover 10 of display device against the limiting screw 103 when the back cover 10 of display device is heated and caused to expand.

The back cover 10 of display device shown in FIG. 1 may be made of polycarbonate (PC material) with a strong impact resistance, which can improve the strength of the back cover 10 of display device. Alternatively, the back cover 10 of display device may be made of acrylonitrile-butadiene-styrene plastic (ABS plastic) with a high strength, lightness, smoothness, easy cleaning and good creep resistance, which can not only improve the strength of the back cover 10 of display device, but also reduce the weight of the back cover 10 of display device.

The back cover 10 of display device as shown in FIG. 1 can be manufactured by means of a plastic suction process. The back cover 10 of display device manufactured by means of the plastic suction process is thin, and can meet the requirement of the thickness $d_1$ of the back cover 10 of display device. Meanwhile, the back cover 10 of display device manufactured by the plastic suction process has the same thickness and a higher flatness. And, the plastic suction process has a simple manufacturing process without any complicated dies, can save more time and improve production efficiency.

In the embodiment of the present disclosure, the first diameter $d_2$ of the limiting screw through hole 101 is larger than the second diameter $d_3$ of the screw rod 103A of the limiting screw 103. Accordingly, this leaves a gap between the periphery of the screw rod 103A of the limiting screw 103 and the limiting screw through hole 101. As a result, this can avoid wave-shaped deformation of the edge of the back cover 10 of display device due to expansion of the back cover 10 of display device when being heated and expanding against the screw rod 103A of the limiting screw 103 in a direction parallel to a surface of the back cover 10 of display device. Since the back cover 10 of display device is not damaged by the force, the back cover 10 of display device can be restored to its original shape after the normal temperature is restored without affecting the appearance of the back cover 10 of display device.

As an example, the difference between the first diameter $d_2$ of the limiting screw through hole 101 and the second diameter $d_3$ of the screw rod 103A of the limiting screw 103 can be in a range of 1 mm to 2 mm. This can ensure sufficient gap left between the periphery of the screw rod 103A and the limiting screw through hole 101 to avoid wave-shaped deformation of the edge of the back cover 10 of display device due to that the back cover 10 of display device when being heated and expanding against the screw rod 103A of the limiting screw 103 in a direction parallel to the surface of the back cover 10 of display device. At the same time, this also can avoid the gap between the periphery of the screw rod 103A of the limiting screw 103 and the limiting screw through hole 101 from being too large and thereby reducing a limiting effect of the limiting screw 103 at the edge of the back cover 10 of display device.

For example, the difference between the first diameter $d_2$ of the limiting screw through hole 101 and the second diameter $d_3$ of the screw rod 103A of the limiting screw 103 can be 1.5 mm.

The diameter of the fixing screw through hole 102 is equal to the diameter of the screw rod of the fixing screw, so that the fixing screw can fix the back cover 10 of display device together with the middle frame of display device, to enhance stability of the back cover 10 of display device.

As shown in FIG. 1, the back cover 10 of display device is rectangular, and the plurality of limiting screw through holes 101 include first limiting screw through holes 101A located at four sides of the back cover 10 of display device.

As shown in FIG. 2, an outer surface of the back cover 10 of display device is also provided with a screw cap groove 104 connecting with the first limiting screw through hole 101A. A third diameter $d_4$ of the screw cap groove 104 is larger than a fourth diameter $d_5$ of the screw cap 103B of the limiting screw 103, to leave a gap between the periphery of the screw cap 103B of the limiting screw 103 and the screw cap groove 104, so as to avoid the wave-shaped deformation of the edge of the back cover 10 of display device due to that the back cover 10 of display device when being heated and expanding against the screw cap 103B of the limiting screw 103 in a direction parallel to the surface of the back cover 10 of display device.

As an example, the difference between the third diameter $d_4$ of the screw cap groove 104 and the fourth diameter $d_5$ of the screw cap 103B of the limiting screw 103 can be in a range of 1 mm to 2 mm. This can ensure sufficient gap between the periphery of the screw cap 103B of the limiting screw 103 and the screw cap groove 104 to avoid the wave-shaped deformation of the edge of the back cover 10 of display device due to that the back cover 10 of display device when being heated and expanding against the screw cap 103B of the limiting screw 103 in a direction parallel to the surface of the back cover 10 of display device. At the same time, this also can avoid the gap between the periphery of the screw cap 103B of the limiting screw 103 and the screw cap groove 104 from being too large, and thus affecting the appearance of the back cover 10 of display device.

For example, the difference between the third diameter $d_4$ of the screw cap groove 104 and the fourth diameter $d_5$ of the screw cap 103B of the limiting screw 103 can be 1.6 mm.

As shown in FIG. 1, first limiting screw through holes 101A are evenly spaced at the four sides of the back cover 10 of display device. This can ensure that the edges of the four sides of the back cover 10 of display device cannot be deformed in the shape of wave when the back cover 10 of display device is heated to be expanded.

As shown in FIG. 2, a depth $d_6$ of the screw cap groove 104 is greater than a thickness $d_7$ of the screw cap 103B of the limiting screw 103, when an outer surface of the screw cap 103B of the limiting screw 103 is installed flush with the surface of the back cover 10 of display device, a gap is left between the surface of the screw cap 103B close to the screw cap groove 104 and the screw cap groove 104, which can ensure the back cover 10 of display device when being heated have sufficient space to be expand, and prevent the back cover 10 of display device when being heated from expanding against the screw cap 103B of the limiting screw 103 in a direction perpendicular to the surface of the back cover 10 of display device.

As an example, the difference between the depth $d_6$ of the screw cap groove 104 and the thickness $d_7$ of the screw cap 103B of the limiting screw 103 can be in a range of 0.1 mm to 0.5 mm. A sufficient gap between the surface of the screw cap 103B of the limiting screw 103 close to the screw cap groove 104 and the screw cap groove 104 can be ensured, to prevent the back cover 10 of display device when being heated to expand against the screw cap 103B of the limiting screw 103 in a direction perpendicular to the surface of the back cover 10 of display device. At the same time, this also can avoid that the thickness of the back cover 10 of display device is increased due to too large gap, and thereby increasing the overall weight of the display device.

For example, the difference between the depth $d_6$ of the screw cap groove 104 and the thickness $d_7$ of the screw cap 103B of the limiting screw 103 is 0.3 mm.

As shown in FIG. 1, the back cover 10 of display device is rectangular, and the plurality of limiting screw through holes 101 include second limiting screw through holes 101B located at four corners of the back cover 10 of display device.

Figure 3:
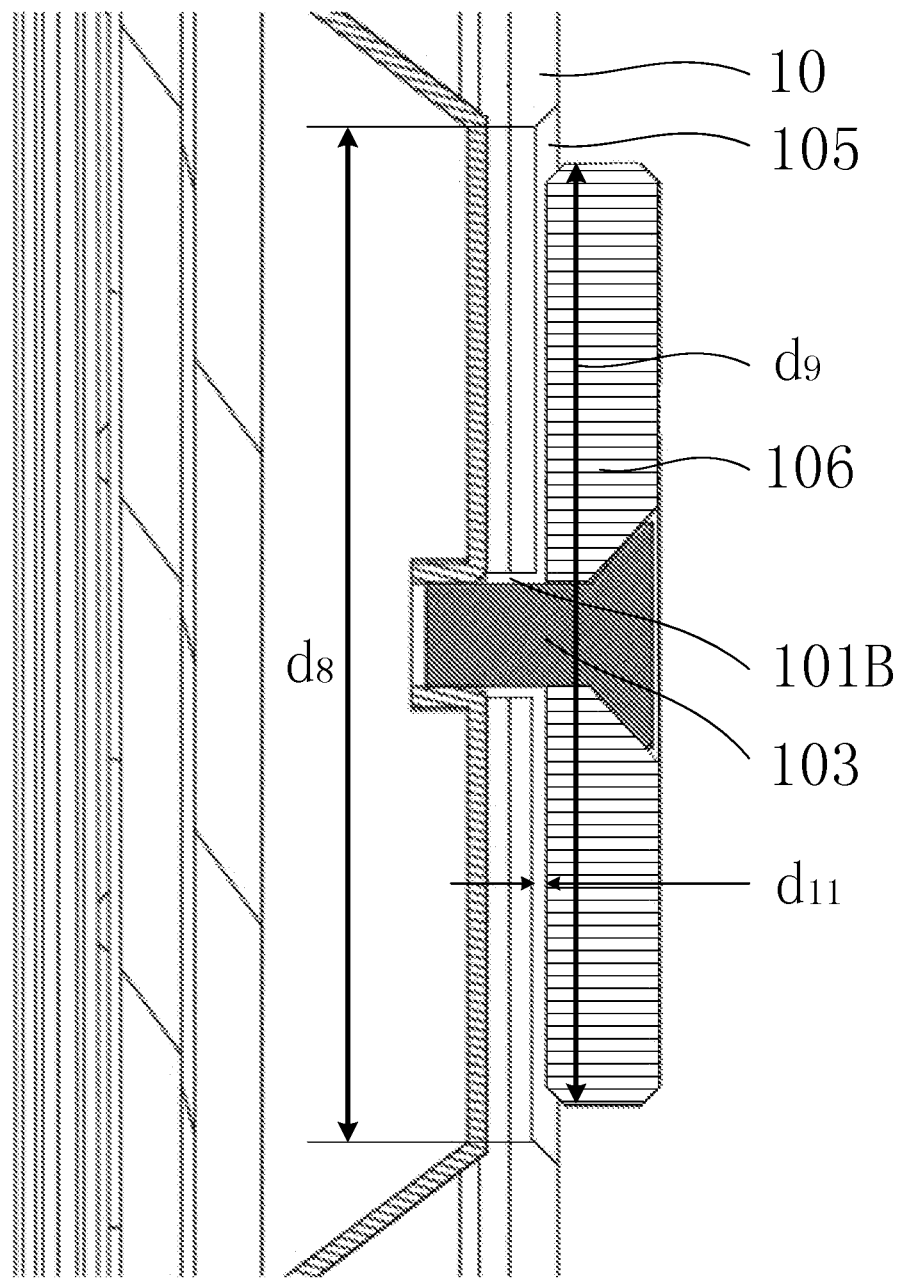
FIG. 3 is a schematic view of an assembly structure of a display device according to an exemplary embodiment of the present disclosure.

FIG. 3 is a schematic view of an assembly structure of a display device of an embodiment of the present disclosure. As shown in FIG. 3, the outer surface of the back cover 10 of display device is also provided with a magnet lock groove 105 connecting with the second limiting screw through hole 101B. A fifth diameter $d_8$ of the magnet lock groove 105 is larger than a sixth diameter $d_9$ of the magnet lock 106 through which the limiting screw 103 passes.

A magnet screw lock attachment includes a limiting screw 103 and a magnet lock 106. The second limiting screw through hole 101B is used for installing the limiting screw 103 of the magnet screw lock attachment. The magnet lock groove 105 is used for installing the magnet lock 106 of the magnet screw lock attachment. The magnet screw lock attachment is used for fixing the display device onto a wall.

For example, the back cover 10 of display device may be the back cover of the television, at the same time, the magnet screw lock attachment can be used to fix the television to the wall. In other implementations, if the display device does not need to be fixed to the wall, the magnet screw lock attachment can connect the back cover 10 of display device with the middle frame of display device.

The fifth diameter $d_8$ of the magnet lock groove 105 is larger than the sixth diameter $d_9$ of the magnet lock 106 through which the limiting screw 103 passes, so that a gap is left between the periphery of the magnet lock 106 and the magnet lock groove 105. This can avoid the wave-shaped deformation of the edge of the back cover 10 of display device due to expansion of the back cover 10 of display device when heated that can expand against the magnet lock 106 in a direction parallel to the surface of the back cover 10 of display device.

As shown in FIG. 1, a second limiting screw through hole 101B can be arranged on each of the four corners of the back cover 10 of display device. This can ensure that the back cover 10 of display device when being heated and expanded cannot cause wave-shaped deformation of the edges on the four corners of the back cover 10 of display device and cannot affect the appearance of the back cover 10 of display device. This can also ensure that each of the four corners of the back cover 10 of display device corresponding to the display device is provided with one magnet screw lock attachment, to strengthen the fixing effect of the magnet screw lock attachment.

In other implementations, a plurality of second limiting screw through holes 101B may be arranged on the four corners of the back cover 10 of display device to enhance the fixing effect of magnet screw lock attachment.

As an example, the difference between the fifth diameter $d_8$ of the magnet lock groove 105 and the sixth diameter $d_9$ of the magnet lock 106 can be in the range of 1 mm to 2 mm. This can ensure that sufficient gap is left between the periphery of the magnet lock groove 105 and the magnet lock 106 to avoid the wave-shaped deformation of the edge of the back cover 10 of display device due to that the back cover 10 of display device when being heated expanding against the magnet lock 106 in a direction parallel to the surface of the back cover 10 of display device. At the same time, this can avoid the gap between the periphery of the magnet lock groove 105 and the magnet lock 106 from being too large, and thus affecting the appearance of the back cover 10 of display device.

For example, the difference between the fifth diameter $d_8$ of the magnet lock groove 105 and the sixth diameter $d_9$ of the magnet lock 106 can be 1.2 mm.

As shown in FIG. 2, the display device includes a middle frame 20 of display device and a back cover 10 of display device connected to the middle frame 20 of display device. The middle frame 20 of display device has a plurality of screw holes 201, which screw holes correspond to the limiting screw through holes 101 one by one. A seventh diameter $d_{10}$ of the screw hole 201 is equal to the second diameter $d_3$ of the screw rod 103A of the limiting screw 103, and a sum of a depth $L_1$ of the limiting screw through hole 101 and a depth $L_2$ of the screw hole 201 is smaller than a length $L_3$ of the screw rod 103A of the limiting screw 103.

The seventh diameter $d_{10}$ of the screw hole 201 is equal to the second diameter $d_3$ of the screw rod 103A of the limiting screw 103, so that the back cover 10 of display device can be fixed on the middle frame 20 of display device, to ensure the stability of the back cover 10 of display device.

The sum of the depth $L_1$ of the limiting screw through hole 101 and the depth $L_2$ of the screw hole 201 is smaller than the length $L_3$ of the screw rod 103A of the limiting screw 103. This can ensure a gap is left between one side of the screw cap 103B of the limiting screw 103 close to the screw cap groove 104 and the screw cap groove 104, and also can avoid the back cover 10 of display device when being heated to be expanded from extruding against the screw cap 103B of the limiting screw 103 in a direction perpendicular to the surface of the back cover 10 of display device.

As shown in FIG. 3, there is a gap $d_{11}$ between one side of the magnet lock 106 close to the magnet lock groove 105 and the magnet lock groove 105. This can avoid the back cover 10 of display device when being heated expanding against the magnet lock 106 in a direction perpendicular to the surface of the back cover 10 of display device.

As an example, the gap $d_{11}$ can be in a range of 0.1 mm and 0.5 mm. A sufficient gap left between one side of the magnet lock 106 close to the magnet lock groove 105 and the magnet lock groove 105 can be ensured, to prevent the back cover 10 of display device when being heated expanding against the magnet lock 106 in a direction perpendicular to the surface of the back cover 10 of display device. At the same time, this also can avoid the thickness of the back cover 10 of display device is increased due to too large gap, and thereby increasing the weight of the display device.

For example, the gap $d_{11}$ between the side of the magnet lock 106 close to the magnet lock groove 105 and the magnet lock groove 105 can be 0.2 mm.

As shown in FIG. 1, the back cover 10 of display device further includes a suspension arm 107 located in the middle of the back cover 10 of display device, and the fixing screw through hole 102 is located on the suspension arm 107. The suspension arm 107 cooperates with a suspension column on the wall such that the display device is suspended on the wall. The fixing screw through hole 102 here is also used to fix the suspension arm 107 to the back cover 10 of display device.

As shown in FIG. 1, there are four fixing screw through holes 102, and the fixing screw through holes are evenly distributed on both sides of the suspension arm 107, so that the display device can be conveniently suspended on the wall. In other implementations, the number of the fixing screw through holes 102 may be greater than 4 or less than 4, and the specific number and position of the fixing screw through holes 102 can be determined according to actual process requirements.

In other implementations, the back cover 10 of display device may not have a suspension arm 107, and the fixing screw through hole 102 is located on the back cover 10 of display device.

The number of the first limiting screw through holes 101A and the second limiting screw through holes 102B can be determined according to the specific process requirements, which will not be limited thereto.

As shown in FIG. 2, the display device further includes a display back panel 30, a frame 40, and a display panel 50. The display back panel 30 corresponds to a base of the entire display device, and other components are fixed on the display back panel 30, for example, the middle frame 20, the frame 40, and the display panel 50. The frame 40 and the back cover 10 are used to package the display panel 50. The display panel 50 is used to display an image.

It should be noted that the shape of the through hole, the screw hole, the screw cap, the screw rod and other parts which are defined by the diameters in this application are all circular.

The above description is only the preferred embodiments of the present disclosure, but is not intended to limit the disclosure. Any modifications, equivalents, improvements, etc. made within the spirit and principle of the present disclosure shall be included within the scope of protection of the present disclosure.

What is claimed is:

1. A display device, comprising a middle frame and a back cover, a limiting screw and a fixing screw,
the back cover being connected with the middle frame and including:
a plurality of limiting screw through holes that are arranged at intervals along an edge of the back cover of the display device, a first diameter of the limiting screw through hole is larger than a second diameter of a screw rod of a limiting screw; and
a fixing screw through hole that is located closer to a middle of the back cover of the display device relative to the limiting screw holes, a diameter of the fixing screw through hole is equal to a diameter of a screw rod of a fixing screw that fixes the back cover together with the middle frame,
wherein the back cover of the display device has a thickness between 1 mm and 1.5 mm;
the middle frame of the display device has a plurality of screw holes corresponding to the limiting screw through holes in the back cover of the display device;
a diameter of the screw hole is equal to the second diameter of the screw rod of the limiting screw; and
a sum of a depth of the limiting screw through hole and a depth of the screw hole is smaller than a length of the screw rod of the limiting screw.

2. The display device according to claim 1, wherein a difference between the first diameter and the second diameter is in a range of 1 mm to 2 mm.

3. The display device according to claim 1, wherein the plurality of limiting screw through holes further comprise:
a first limiting screw through hole, where an outer surface of the back cover of the display device is further provided with a screw cap groove for connecting with the first limiting screw through hole, a third diameter of the screw cap groove is larger than a fourth diameter of a screw cap of the limiting screw.

4. The display device according to claim 3, wherein the difference between the third diameter of the screw cap groove and the fourth diameter of the screw cap of the limiting screw is in a range of 1 mm to 2 mm.

5. The display device according to claim 3, wherein a depth of the screw cap groove is greater than a thickness of the screw cap of the limiting screw.

6. The display device according to claim 5, wherein a difference between the depth of the screw cap groove and the thickness of the screw cap of the limiting screw is in a range of 0.1 mm to 0.5 mm.

7. The display device according to claim 1, wherein the back cover of the display device is a polycarbonate or acrylonitrile-butadiene-styrene plastic back cover.

8. The display device according to claim 1, wherein the plurality of limiting screw through holes further comprise:
a second limiting screw through hole, where an outer surface of the back cover of the display device includes a magnet lock groove for connecting with the second limiting screw through hole, a diameter of the magnet lock groove is larger than a diameter of a magnet lock through which the limiting screw passes.

9. The display device according to claim 8, wherein a difference between the diameter of the magnet lock groove and the sixth diameter of the magnet lock is in a range of 1 mm to 2 mm.

10. The display device according to claim 1, wherein the back cover of the display device is rectangular and the plurality of limiting screw through holes further comprise:
a second limiting screw through hole where an outer surface of the back cover of the display device is further provided with a magnet lock groove for connecting with the second limiting screw through hole; and
the display device further includes a magnet lock, the limiting screw passes through the magnet lock and a gap is formed between one side of the magnet lock close to the magnet lock groove and the magnet lock groove.

11. The display device according to claim 10, wherein the gap is in a range of 0.1 mm to 0.5 mm.

* * * * *